Jan. 14, 1964   J. E. G. YOUNG   3,117,420
HYDROSTATIC TRANSMISSION

Filed May 24, 1962   5 Sheets-Sheet 4

INVENTOR
JOHN E. G. YOUNG,

BY   *Dodge and Sons*
ATTORNEYS

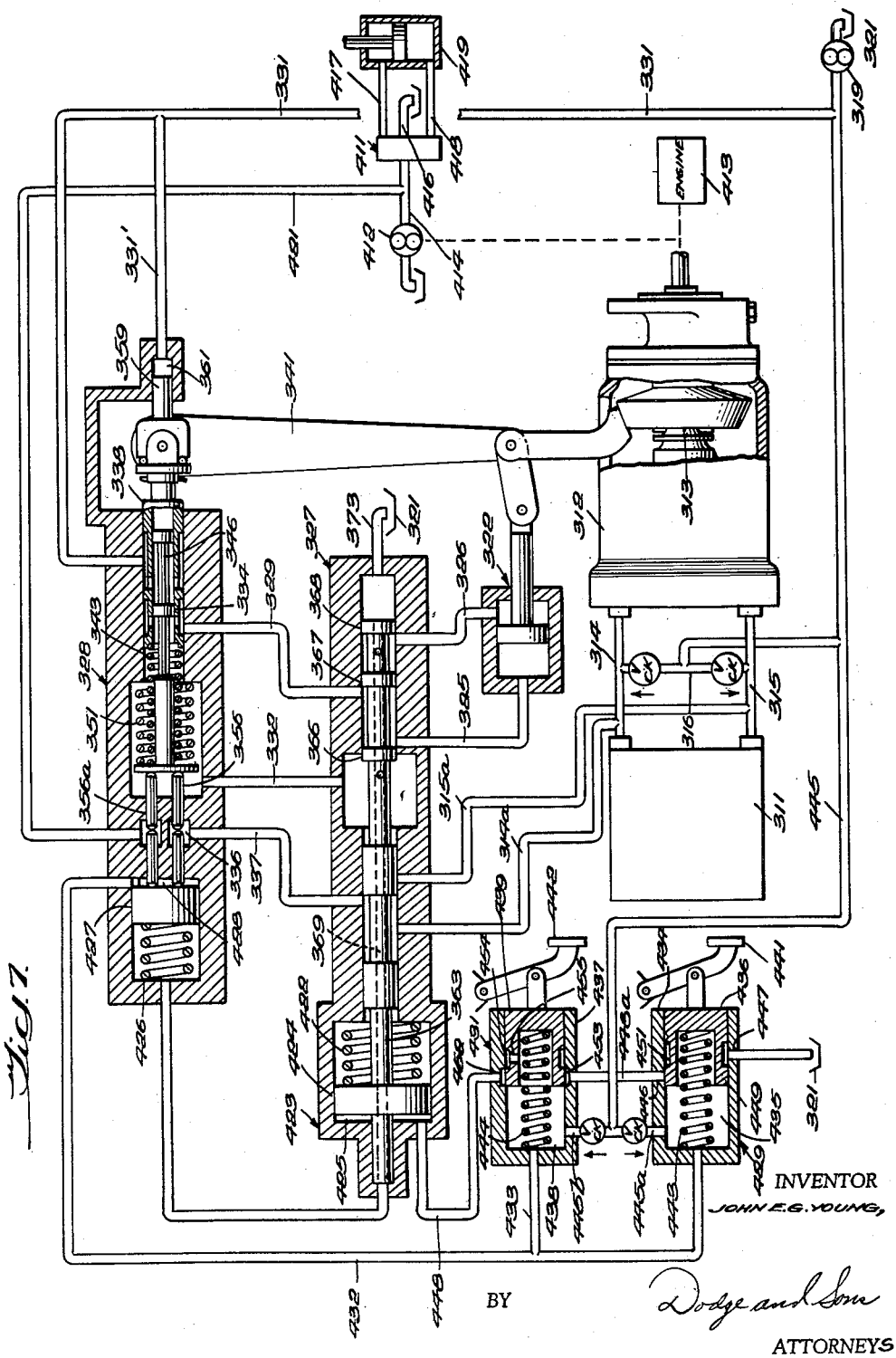

United States Patent Office 3,117,420
Patented Jan. 14, 1964

3,117,420
HYDROSTATIC TRANSMISSION
John E. G. Young, Watertown, N.Y., assignor to The
New York Air Brake Company, a corporation of New
Jersey
Filed May 24, 1962, Ser. No. 198,686
21 Claims. (Cl. 60—52)

This invention relates to hydrostatic transmissions and particularly to improved servo controls and safety features for such transmissions.

This application is a continuation-in-part of my co-pending application Serial No. 134,451, filed August 28, 1961, now abandoned.

A hydrostatic transmission, as known in the prior art, includes a closed circuit having a pump and a motor, the motor being driven by the pump and serving itself to drive the load to be operated upon. Both the pump and the motor are reversible and one or the other is of the variable displacement type. In the present invention, the pump is the variable displacement unit and reversal of flow is brought about by a displacement control element that is shiftable in opposite directions from a zero displacement position toward which it is biased.

The servo system for positioning the displacement control element includes a reservoir, a source of control pressure, a double-acting motor connected with the displacement control element and a three-position directional control valve having a supply passage. The directional control valve has a neutral position in which the double-acting motor is allowed to float, a forward position in which one working chamber of the motor is connected with the supply passage and the other working chamber is connected with the reservoir, and a reverse position in which the connections between the working chambers and the supply passage and the reservoir are reversed. The supply passage is selectively connected with the source and the reservoir by a follow-up valve including a movable valve member and a coacting movable valve element. Relative movement of the valve member and element establishes a supply position in which the supply passage is connected with the source, a vent position in which the supply passage is connected with the reservoir and an intermediate null position in which the supply passage is isolated from both the source and the reservoir. The valve member is biased toward a supply position relative to the valve element by a graduating spring and is shifted in the opposite direction by a fluid pressure override motor that responds to the pressure in the high-pressure side of the transmission circuit. The valve element, on the other hand, is connected with the displacement control element by follow-up linkage which shifts it toward a null position relative to the valve member as the displacement control element moves away from the zero displacement position in either direction.

In one embodiment of the invention, the follow-up valve normally assumes a supply position so that when the directional control valve is shifted from neutral position to either the forward or reverse position, the double-acting motor immediately moves the displacement control element to maximum displacement position. In this case, a manual actuator is provided for shifting the valve member of the follow-up valve in the direction of a vent position relative to the valve element so that the displacement of the transmission pump can be reduced gradually to zero. In two other embodiments, the follow-up valve is provided with a biasing device that normally overrides the graduating spring and holds the valve member in a vent position relative to the valve element. In these cases, the system includes a manual actuating mechanism that shifts the directional control valve to either the forward or reverse position and then progressively disables the biasing device to thereby allow the graduating spring to move the valve member in the direction of a supply position with respect to the valve element. As a safety precaution, the actuating mechanism includes an interlock between the forward and reverse controls so that neither can be operated when the other is in control of the directional control valve.

In each embodiment, the fluid pressure override motor is selectively connected with whichever side of the transmission circuit is the high pressure side by a selector valve operated in unison with the directional control valve. Since this motor is actuated by the load pressure in the transmission circuit, and shifts the valve member to a vent position, it serves to limit the load which the transmission imposes on the prime mover. Furthermore, since the direction of operation of the transmission is controlled by the directional control valve and not by the follow-up valve, this load-limiting effect is achieved without risk of the override device moving the displacement control element beyond zero displacement position and inadvertently reversing the direction of flow. This feature is vitally important when the transmission is used to propel a vehicle.

In some installations, for example front end loaders, the vehicle engine drives an implement pump as well as the pump of the hydrostatic transmission used to propel the vehicle. Transmissions used in this environment follow the teachings in the co-poending application of Charles O. Weisenbach and Samuel G. Williams, Serial No. 306,-218, filed September 3, 1963, and include a second fluid pressure override motor that responds to the load pressure in the implement circuit. In this way, stalling of the vehicle engine as a result of the combined loads of the propulsion and implement circuits is prevented by reducing the speed of, and therefore the load imposed by, the hydrostatic transmission.

The transmission circuit also includes, according to the present invention, means to prevent loading of the circuit when the directional control valve is in the neutral position and the motor is driven by external forces. This is a condition which arises, for example, when a vehicle using this transmission is being towed. This function is performed by a secondary vent from the control chamber of a piloted high pressure relief valve, which vent is open in the neutral position of the directional control valve, but is closed in its other two positions.

Three embodiments of the invention are described herein with reference to the accompanying drawings in which:

FIG. 7 is a simplified schematic diagram of another transmission suitable for use on a front end loader.

*First Embodiment*

Figure 1:
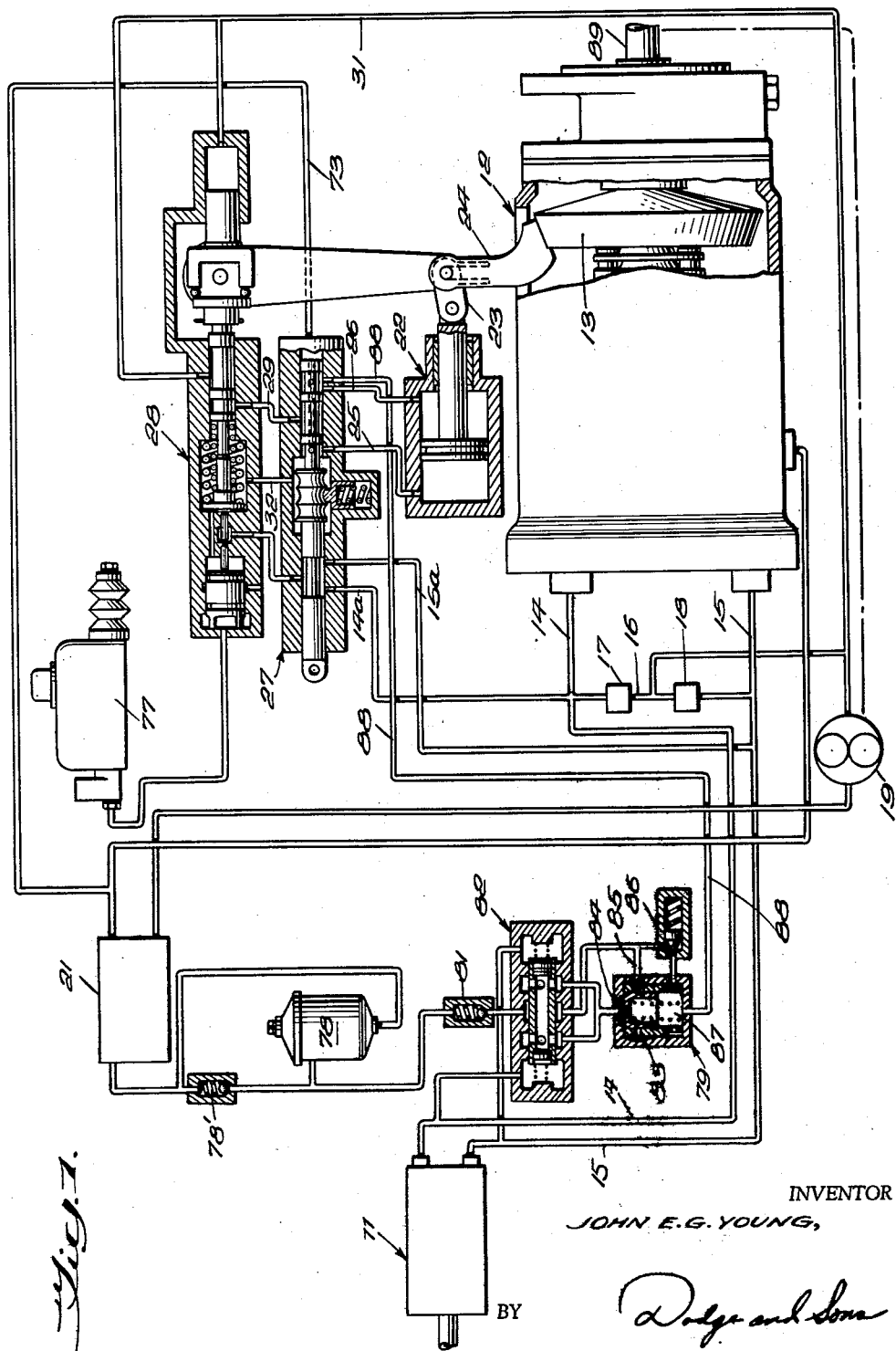
FIG. 1 is a schematic diagram of an improved transmission according to this invention suitable for use on a lift truck.

As shown in FIG. 1, the transmission includes a reversible, fixed displacement motor 11 and a reversible, variable displacement pump 12. Pump 12 is of the rotary cylinder barrel longitudinally-reciprocating piston type and includes a cam plate 13 that is shiftable between maximum stroke-establishing positions on opposite sides of the illustrated zero stroke-establishing position. The trunnions (not shown) supporting the cam plate are so positioned that the piston forces urge the cam plate toward the illustrated neutral position. First and second main conduits 14 and 15 interconnect the pump 12 and motor 11 in a closed transmission circuit. A cross-conduit 16 extends between conduits 14 and 15 and has in it reversely-set check valves 17 and 18 through which charge pump 19 supplies liquid to the transmission circuit from a reservoir 21.

A double-acting piston motor 22 is connected with cam plate 13 by a linkage schematically shown as including a link 23 and arm 24. Fluid is supplied to and exhausted from the opposed working chambers of motor 22 through conduits 25 and 26 under the control of a directional control valve 27 and a follow-up valve 28. The follow-up valve 28 is connected with the directional control valve through the latter's supply passage 29, with charge pump 19 through conduit 31, and with reservoir 21 through conduit 32.

Figure 2:
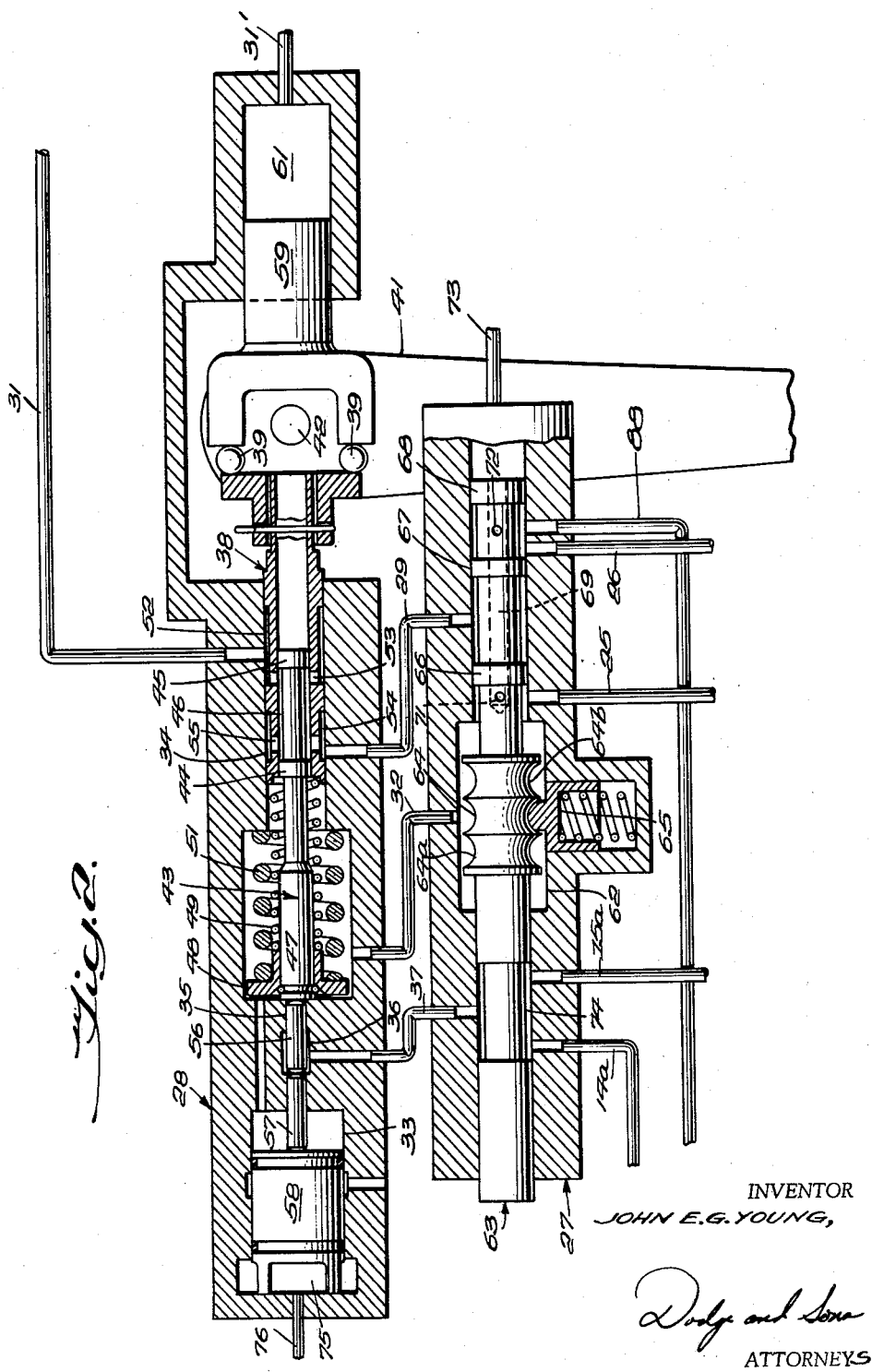
FIG. 2 is an enlarged detailed view showing, mostly in axial section, the follow-up valve, the directional control valve and a part of the follow-up linkage used in the FIG. 1 embodiment.

The directional control valve 27 and the follow-up valve 28 are shown on a larger scale in FIG. 2 to which reference will now be made. The follow-up valve 28 comprises a housing having aligned bores 33 and 34 which are interconnected by a small diameter guide bore 35 which is encircled by groove 36. A conduit 37 communicates with groove 36. Valve sleeve 38 is slidable in bore 34 and its right end extends outward into engagement with cam pins 39 carried by arm 41. Arm 41 is pivoted at 42 and is connected by a pin and clevis to the link 23 and arm 24 (see FIG. 1). Slidable in valve sleeve 38 is a valve plunger 43 formed with two valve lands 44 and 45 separated by an annular groove 46. The stem 47 of valve plunger 43 carries a combined spring seat and stop 48. A light spring 49 reacts between the valve sleeve 38 and seat 48 and a heavier graduating spring 51 reacts between the housing and the spring seat 48. The valve sleeve 38 has a supply chamber 52 formed in its outer surface which is connected with conduit 31 and from which radial ports 53 extend inward, and a controlled chamber 54 which is in constant communication with supply passage 29 of valve 27. This chamber 54 communicates with annular groove 46 by way of radial ports 55.

The valve plunger 43 can be shifted to the right from the illustrated position by an override motor including a piston 56 which is slidable in and fitted to guide bore 35 and which responds to the pressure in groove 36. Rightward movement of valve plunger 43 also can be effected by a second motor comprising piston 58 and working chamber 75. A thrust rod 57 guided in bore 35 and the piston 56 transmit shifting forces from piston 58 to the valve plunger. The working chamber 75 of the second motor receives liquid through conduit 76 from a manually-controlled pressure generator such as the master brake cylinder 77. The valve sleeve 38 can be shifted to the left from the illustrated position by the follow-up linkage including arm 41, and associated with this linkage is a motor comprising piston 59 and working chamber 61 that, through the follow-up linkage, urges the cam plate 13 toward the zero displacement position. Working chamber 61 receives fluid from conduit 31 through conduit 31′.

The directional control valve 27 includes a housing having a through bore formed with an enlarged central detent chamber 62 and containing a reciprocable valve plunger 63. Three detent grooves 64, 64a, and 64b are formed on the plunger to receive the coacting spring biased detent latch 65. To the right of the detent grooves is a reduced diameter portion encircled by valve lands 66, 67 and 68. An axial bore 69 extends into the reduced diameter portion of valve plunger 63 and connects with the radial ports 71 located to the left of land 66 and with the radial ports 72 located between lands 67 and 68. Conduit 73 extends from the closed right end of the valve bore to reservoir 21. Annular groove 74 is formed in the valve plunger 63 to the left of detents 64 and this groove is in constant communication with conduit 37. Branch conduits 14a and 15a, respectively, extend from main conduits 14 and 15 and are selectively blocked by valve plunger 63 according as to whether the valve 27 is in the forward or the reverse position.

Referring again to FIG. 1, the transmission includes a filter 78 and a low-pressure bypass relief valve 78′. It also includes a piloted high pressure relief valve 79 and a low pressure relief valve 81. The relief valves 79 and 81 are connected in the circuit by a shuttle valve 82. Shuttle valve 82 is centered by centering springs, as shown, when the pressures in main conduits 14 and 15 are equal. Unequal pressures shift valve 82 to the right or to the left to connect the lower pressure conduit to the low pressure relief valve 81 through the close ended central bore of shuttle valve 82 and to connect the higher pressure conduit to the high pressure relief valve 79. The high pressure relief valve 79 includes a valve piston 83 through which a restricted port 84 extends. A relief port 85 is controlled by valve piston 83. A spring-biased pilot valve 86 opens in response to excessive system pressure in chamber 87 to vent that chamber more rapidly than it can be supplied with liquid through restricted port 84. This produces rapid movement of valve piston 83 to its relief position. A more detailed description of the operation of the high and low pressure relief valves and the shuttle valve appears in U.S. Patent 2,961,829, issued November 29, 1960. Conduit 88 extends from chamber 87 to the directional control valve 27 and is controlled by lands 67 and 68 by which it is blocked when valve 27 is in either the forward or the reverse position. In the neutral position of valve 27, conduit 88 is vented to reservoir 21 through ports 72, axial bore 69 and conduit 73. This vent path provided by conduit 88 bypasses pilot valve 86 and allows fluid to flow from one side of the system to the other at low pressure when the directional control valve 27 is in its neutral position. This feature is particularly useful when the transmission is used to drive the wheels of a vehicle because it permits towing of the vehicle.

Pump 12 has a drive shaft 89. This drive shaft is connected with the drive shaft of charge pump 19, as is conventionally indicated by the broken line in FIG. 1.

*Operation of First Embodiment*

Let it be assumed that the transmission is used to transmit power from the drive shaft of an internal combustion engine to the drive wheels of a vehicle, such as a lift truck. With the engine idling and the directional control valve 27 in its illustrated position, the opposite sides of the double-acting piston motor 22 are connected with the reservoir 21 via conduits 25 and 26, radial ports 71 and 72, axial bore 69 and conduit 73. The illustrated neutral position of the forward and reverse valve 27 is commonly called a "float" position since it permits motor 22 to float or move relatively freely under the action of external forces. The forces exerted by the pump pistons on cam plate 13 in conjunction with the biasing force developed by the charge pump pressure in motor chamber 61 acting on piston 59 returns valve sleeve 38, double-acting motor 22 and cam plate 13 to their illustrated neutral positions. At this time, pressures in main conduits 14 and 15 will be low and, therefore, graduating spring 51 will return valve plunger 43 to its illustrated position.

If it is desired to drive the vehicle in the forward direction, valve 27 is shifted to its forward position in which, for purposes of this description, it will be assumed that conduit 25 is placed in communication with supply passage 29 and that conduit 26 remains connected to the reservoir 21 by radial ports 72, axial bore 69, and conduit 73. Conduit 88, however, is blocked which restores the high pressure relief valve 79 to normal operation.

Liquid under pressure now flows from charge pump 19 to the left-hand working chamber of motor 22 via conduit 31, chamber 52, ports 53, annular groove 46, ports 55, chamber 54, supply passage 29, the space between lands 66 and 67, and conduit 25, where it is effective to cause motor 22 to shift cam plate 13 to its maximum stroke-establishing position on the forward side of neutral position. Movement of cam plate 13 actuates the valve sleeve 38 of the follow-up valve through the arm 41 and the upper cam pin 39 causing the sleeve to move to the left and permit land 44 to block ports 55. When cam plate 13 reaches the maximum stroke-establishing position, ports 55 will be closed and motor 22 will be hydraulically locked against movement toward the neutral position.

With cam plate 13 in maximum stroke-establishing position, the displacement of pump 12, and consequently the speed of the vehicle, will be a maximum. The speed of the vehicle may be reduced, or the vehicle may be stopped by the operator by simply actuating master brake cylinder 77 to increase the hydraulic pressure transmitted to working chamber 75 through conduit 76. The pressure in this working chamber develops a force on piston 58 that is effective (through thrust rod 57 and piston 56) to urge valve plunger 43 to the right against the bias of graduating spring 51. When this force exceeds the preload in spring 51, plunger 43 shifts to the right from the null position, in which land 44 blocks ports 55, to a vent position in which it establishes a flow path from the left side of motor 22 to reservoir 21 including conduit 25, supply passage 29, chamber 54, ports 55, conduit 32, detent chamber 62, radial ports 71, axial bore 69 and conduit 73. Venting of the left side of motor 22 destroys the hydraulic lock and permits the piston forces acting on cam plate 13 and the motor 59, 61 to move the cam plate 13 toward the zero displacement position. Since spring 49 maintains valve sleeve 38 in operative engagement with cam pin 39, this movement of the cam plate 13 and arm 41 is accompanied by a following movement to the right of valve sleeve 38. When ports 55 are again lapped by land 44 (i.e., when the follow-up valve is again in a null position), movement of the cam plate 13, motor 22 and sleeve 38 ceases. Since the cam plate 13 is now in an intermediate stroke or displacement-establishing position, the vehicle will operating at a slower speed. Further reductions in speed can be effected progressively by progressively increasing the pressure in working chamber 75. Similarly, progressive increases in speed are effected by progressively decreasing the pressure in working chamber 75.

If the load on the transmission should increase (for example, as a result of the vehicle encountering an incline), the pressure in the main flow conduit 14 will increase. This pressure is transmitted to groove 36 of follow-up valve 28 via branch conduit 14a, annular groove 74, and conduit 37 where it acts upon piston 56 and develops a force tending to shift this member and valve plunger 43 to the right against the bias of graduating spring 51. When the pressure force becomes greater than the preload in spring 51, valve plunger 43 moves to the right to a vent position and uncovers ports 55. As in the case of the manual control effected through master brake cylinder 77, this action establishes a vent path from the left side of motor 22 to reservoir 21 and enables cam plate 13 to move toward the zero displacement position. The accompanying following movement of valve sleeve 38 brings ports 55 to a null or lap position relative to land 44 and terminates movement of motor 22 when the position of cam plate 13 corresponds to the new position of valve plunger 43. If the load, and consequently the pressure in main conduit 14, continues to increase, cam plate 13 will be moved progressively to the zero stroke-establishing position. It will be apparent that the cam plate 13 is moved back toward the maximum stroke-establishing position (or back toward an intermediate position if the load increase occurs at a time when master brake cylinder 77 is in control) upon a decrease in the load imposed on the transmission.

Since the piston 56 of the override motor serves to regulate pump displacement in inverse relation to system pressure, and since the relationship between displacement (and, therefore speed) and pressure (i.e., load) is a function of the linear rate of graduating spring 51, it is obvious that the horsepower required to drive the transmission at any throttle setting of the engine is substantially constant. Spring 51 is so designed that the horsepower demand imposed on the engine at any throttle setting is safely below the stalling load.

When the directional control valve 27 is returned to its neutral position, the left side of motor 22 is again vented and motor 59, 61, and the pump piston forces return cam plate 13 to the zero displacement position. Simultaneously, spring 49 moves valve sleeve 38 to the illustrated supply position with respect to valve plunger 43.

In order to drive the vehicle in the reverse direction, valve plunger 63 is shifted to the right to the detent position defined by groove 64a. In this case, the left side of motor 22 is continuously vented to reservoir through conduit 25, radial port 71, axial bore 69 and conduit 73, and the right side of that motor is placed in communication with the supply passage 29. Under these conditions, motor 22 moves the cam plate 13 to the maximum stroke-establishing position on the reverse side of the zero displacement position and follow-up movement of valve sleeve 38 is effected through the lower cam pin 39. As in the previous case, the displacement of pump 12 (and, therefore, the vehicle speed) can be reduced manually through the action of the master brake cylinder 77 or automatically through the action of piston 56 of the override motor. In the case of reverse operation, main conduit 15 becomes the high pressure conduit so valve plunger 63 closes branch conduit 14a and annular groove 74 connects branch conduit 15a with conduit 37. Except for these differences, the mode of operation in reverse drive is the same as the mode of operation in forward drive.

The piston 58 may be replaced by a direct manually-operated actuator, but importantly, the operation of piston 58 is manually controlled. In the illustrated embodiment, piston 58 is actuated by pressure in the braking system. The size of piston 58 is such relative to the size of piston 56 that the follow-up valve will vent the active chamber of the motor 22, causing the pump to move to zero displacement position, during initial buildup of pressure in the brake cylinder. A pressure sufficient to apply the brakes is preferably developed only after the displacement of pump 12 is nearly zero.

It will be noticed that when directional control valve 27 is in either the forward or the reverse position only the high pressure main conduit 14 or 15 is connected through branch conduit 14a or 15a to the conduit 37 and groove 36. This is an important feature, because if the vehicle is travelling down an incline, the motor 11 may be overrun and act as a pump. Except for the fact that the low pressure conduit is isolated from groove 36 this could cause a high pressure to develop in groove 36 causing the pump 12 to go to zero displacement. Since motor 11 is of the positive displacement type, this would cause an abrupt stop because liquid would be trapped at the setting of high pressure relief valve 79. The operator would not be able to control this braking, except by movement of the directional control valve to neutral position, and this he could not do quickly enough.

It is to be noted, too, that neither piston 58 nor piston 56 can move the pump cam over center. There is no possibility of inadvertently reversing the direction of flow through the circuit.

*Second Embodiment*

Figure 3:
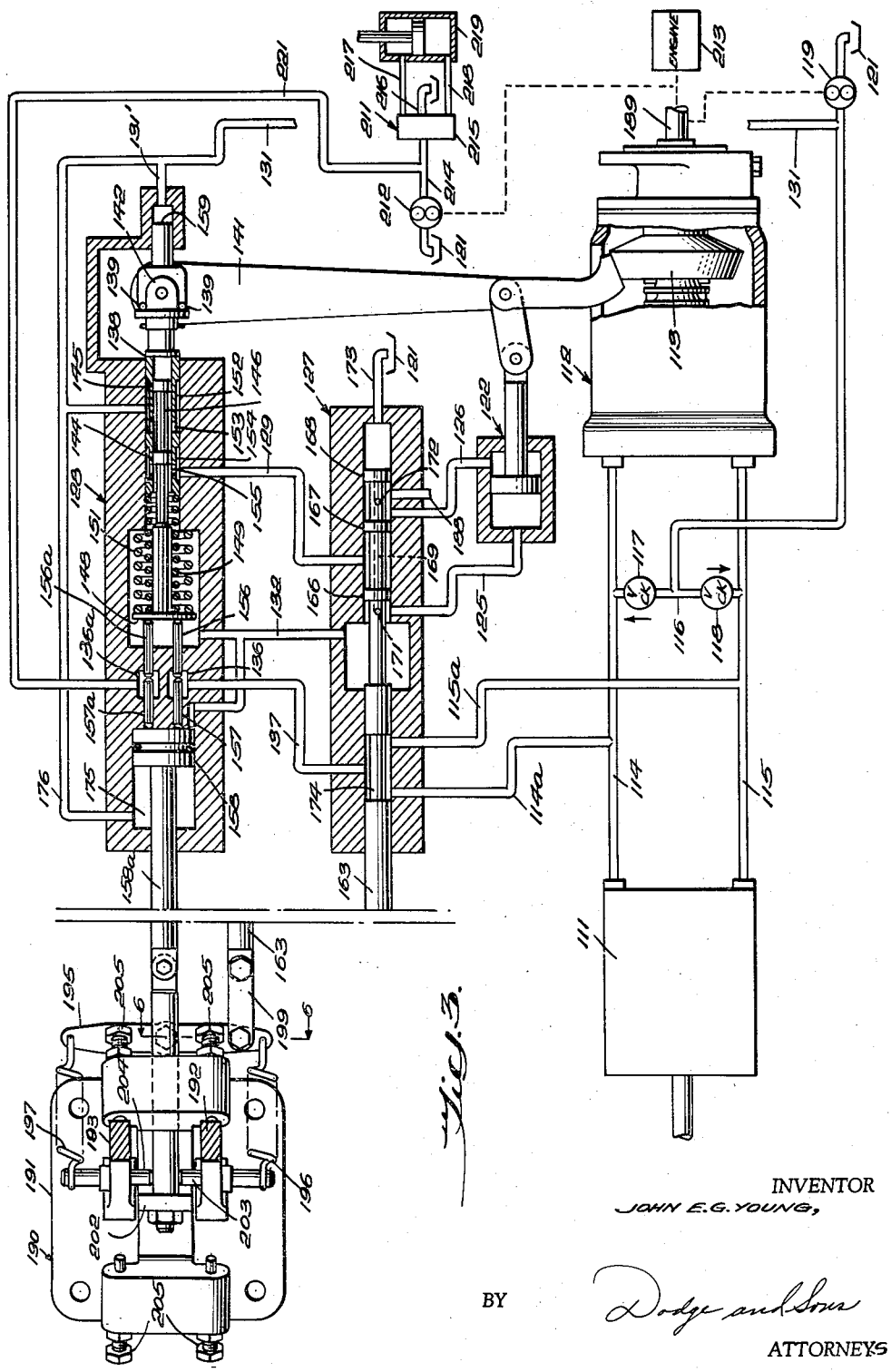
FIG. 3 is a simplified schematic diagram of an improved transmission according to this invention suitable for use on a front end loader.
Figure 4:
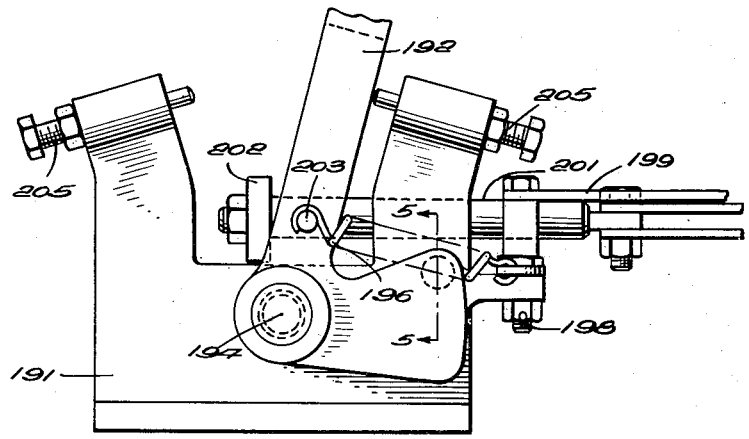
FIG. 4 is an elevation view of the actuating mechanism employed in FIG. 3.

In the first embodiment of the invention, follow-up valve 28 normally assumes a supply position and therefore shifting of the directional control valve 27 to the forward or reverse position causes the transmission to operate at maximum speed for the prevailing engine speed. Speed reduction in this case is accomplished by the brake circuit. This mode of operation is preferred by the users of lift trucks but is not considered satisfactory in the case of front end loaders. In the case of loaders, it is preferred to have the transmission assume a condition of rest and to require the operator to exert positive control action in order to increase speed. FIG. 3 illustrates a transmission according to this invention which is suitable for use on a front end loader. Since this circuit employs the same basic components as the one shown in FIGS. 1 and 2, corresponding parts in the second embodiment bear reference numerals one hundred higher than their counterparts in the first embodiment. Although the relief circuit has not been shown in FIG. 3, it will be understood that such a circuit is used in the actual installation.

In the FIG. 3 embodiment, the directional control valve 127 is identical to the directional control valve 27 of FIG. 1, except that the detent 64, 64a, 64b and 65 which is no longer required has been omitted. The follow-up valve 128 also is basically the same as its counterpart 28 in the first embodiment but here the valve plunger 143 is biased to a vent position relative to valve sleeve 138 by a biasing motor comprising piston 158 and working chamber 175. This motor is constantly pressurized by charge pump 119 through conduits 131 and 176 and normally overpowers graduating spring 151 and holds valve plunger 143 in the illustrated position.

A manual actuating mechanism 190 is provided in the second embodiment for operating both of the valves 127 and 128. This mechanism includes a base 191 carrying forward and reverse levers 192 and 193, respectively, which are mounted for pivotal movement about axis 194 and which are connected to opposite ends of lever 195 by coil springs 196 and 197. Lever 195 pivots at its center about bolt 198 and is connected with the valve plunger 163 of the directional control valve 127 by a link 199. Counterclockwise movement of levers 192 and 193 about axis 194 causes directional control valve 127 to move to the left and right, respectively, from its neutral position shown in FIG. 3. Located between levers 192 and 193 is a rod 201 which is guided in a bore formed in base 191 and which is connected at one end with the piston rod 158a of biasing motor 158, 175. At its other end, rod 201 carries an enlarged head 202 which is positioned in the path of travel of the pins 203 and 204 carried by levers 192 and 193, respectively, and which, in the illustrated neutral positions of these levers, is spaced slightly from these pins. The head 202 and pins 203 and 204 constitute a lost motion connection between the levers 192 and 193 and the rod 201, and this connection is so designed that the levers do not shift rod 201 (and consequently plunger 143 of the follow-up valve) until after the directional control valve 127 has been moved to either its forward or its reverse position. Four stop screws 205 are provided for limiting the movement of the levers 192 and 193.

Figure 5:
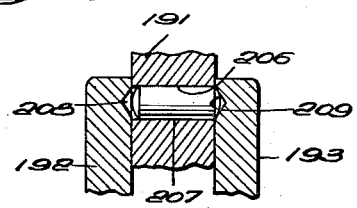
FIG. 5 is a sectional view taken on line 5—5 of FIG. 4.
Figure 6:
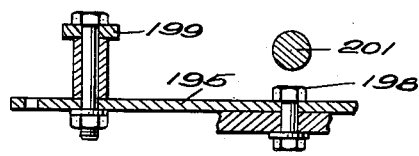
FIG. 6 is a sectional view taken on line 6—6 of FIG. 3.

As shown in FIG. 5, base 191 is formed with a transverse bore 206 containing a pin 207. When the levers 192 and 193 are in the neutral position, conical depressions 208 and 209 formed in their inner side faces are aligned with bore 206. The rounded ends of pin 207 can move into these recesses 208 and 209 and the length of pin 207 is so selected that one end of the pin is clear of the adjacent recess when the opposite end is bottomed in the recess adjacent it. When lever 192 is moved away from the illustrated neutral position, the conical wall of recess 208 serves as a cam and shifts pin 207 into recess 209 and out of the path of travel of lever 192. After the recess 208 is moved out of alignment with bore 206, the flat side face of lever 192 holds pin 207 in recess 209 and prevents movement of lever 193 away from its neutral position. Similarly, movement of lever 193 away from the neutral position forces pin 207 into recess 208 where it locks lever 192 in the neutral position. The pin 207 therefore serves as an interlock which prevents actuation of either of the levers 192 or 193 when the other lever, and consequently the directional control valve, is away from its neutral position.

In the usual case, the loader includes a hydraulic circuit for actuating the material-handling bucket. In FIG. 3, such an implement circuit is indicated at 211 and includes a fixed displacement pump 212 driven by engine 213 and arranged to deliver fluid under pressure to a conduit 214 leading to the inlet port of a four-way open center directional control valve 215. Directional control valve 215 is provided with an exhaust conduit 216 and a pair of motor conduits 217 and 218 which are connected with the opposite sides of a double-acting piston motor 219. Although only one motor 219 is illustrated, it will be understood that in most cases, a plurality of such motors is used. The load pressure in conduit 214 is transmitted to a second override motor 136a, 156a in follow-up valve 128, via conduit 221. This feature of the transmission is disclosed and claimed in co-pending application Serial No. 306,218, referred to above.

Operation of Second Embodiment

When the forward and reverse levers 192 and 193 are in their illustrated neutral positions, springs 196 and 197 hold directional control valve 127 in its neutral position and, therefore, the opposite sides of double-acting motor 122 are vented to reservoir 221 and cam plate 113 is maintained in its zero displacement position by the biasing forces developed by piston 159 and by the pistons of pump 112. Charge pump pressure delivered to the working chamber 175 of the biasing motor causes piston 158, acting through thrust rods 157 and 157a and pistons 156 and 156a, to shift valve plunger 143 to the illustrated vent position against the opposing bias of graduating spring 151. Therefore, at this time, supply passage 129 is vented to reservoir 121 via chamber 154, radial ports 155, conduit 132, radial passages 171, axial bore 169 and conduit 173.

Movement of forward lever 192 in the counterclockwise direction about axis 194 shifts valve plunger 163 to the left from the illustrated neutral position to a forward position in which conduit 125 is connected with supply passage 129 and conduit 126 remains connected with reservoir 121 through radial passages 172, axial bore 169 and conduit 173. Continued movement of lever 192 causes pin 203 to engage head 202 and shift rod 201 and piston 158 to the left. Because of the presence of graduating spring 151, valve plunger 143 of the follow-up valve follows this movement and shifts to a supply position relative to valve sleeve 138 in which groove 146 interconnects passage 129 and conduit 131. Charge pump pressure is now delivered to one side of motor 122 thereby causing it to move cam plate 113 away from the zero displacement position. This movement of the cam plate is accompanied by follow-up movement of valve sleeve 138 to the left and the cam plate comes to rest when sleeve 138 reaches a null position with respect to plunger 143. In this position, land 144 overlies radial ports 155 and thus prevents flow to and from supply passage 129. The position of cam plate 113 determines the displacement of pump 112 and, therefore, the speed of motor 111, and can be varied progressively by movement of lever 192. When this lever is returned to its illustrated neutral position, motor 158, 175 moves valve plunger 143 to the right from the null position with respect to sleeve 138 and again vents supply passage 129 to reservoir 121. The biasing forces acting on cam plate 113 return it to the zero displacement position, and, through the follow-up linkage, move valve sleeve 138 to the right. Since the valve sleeve 138 assumes a vent position with respect to plunger 143 when cam plate 113 is in the zero displacement position, follow-up movement of sleeve 138 is terminated before a null position is established. After cam plate 113 has been moved back to its zero displacement position, continued movement of lever 192 toward its neutral position permits springs 196 and 197 to return the directional control valve 127 to its neutral position.

Movement of lever 193 away from its neutral position shifts plunger 163 of the directional control valve 127 to its reverse position in which supply passage 129 and conduit 126 are interconnected, and then allows valve plunger 143 of the follow-up valve to move progressively to the left to thereby increase the displacement of pump 112 in the opposite direction.

If, during operation in either the forward or the reverse direction, a stalling pressure is developed in the circuit, piston 156 shifts valve plunger 143 to a vent position with respect to sleeve 138, and thereby permits the biasing forces acting on cam plate 113 to move the latter to a reduced displacement position. This action reduces the power demand on engine 213. Similarly, if the combined load imposed on engine 213 by pump 112 and implement pump 212 approaches the stalling value, pistons 156 and 156a are effective to shift the follow-up valve to a vent position and thus reduce the displacement of the pump 112. It will be apparent that the transmission pressure at which override motor 136, 156 is effective to reduce the displacement of pump 112 depends upon the prevailing load pressure in the implement circuit, and, therefore, the power which can be transmitted by the transmission circuit varies between a maximum when the implement circuit is idle and a minimum when the implement circuit is fully loaded.

Third Embodiment

The third embodiment of the invention, shown in FIG. 7, also is intended for use on a front end loader and employs the same basic controls as the second embodiment. The valving function of the directional control valve 327 in this embodiment is the same as in the preceding embodiment, but in this case the valve plunger 363 is biased toward its forward position by a coil spring 422 and is equipped with a fluid pressure shifting motor 423 comprising piston 424 and working chamber 425 that moves it in the opposite direction to the reverse position. The follow-up valve 328 includes a biasing device comprising spring 426 and piston 427 which, as in the FIG. 3 embodiment, acts through the pistons 356 and 356a of the override motors to overpower graduating spring 351 and move valve plunger 343 to a vent position with respect to valve sleeve 338. A motor comprising piston 427 and working chamber 428 is provided for disabling the biasing device and allowing graduating spring 351 to shift valve plunger 343 to a supply position relative to valve sleeve 338.

The working chamber 428 is connected in a closed circuit with a pair of remotely located hydraulic actuators 429 and 431 by conduits 432 and 433. Actuators 429 and 431 are, in essence, piston motors. The actuator 429 includes a cylinder 434, a working chamber 435, and a reciprocable piston 436, and the actuator 431 includes a cylinder 437, a working chamber 438 and a reciprocable piston 439. Pistons 436 and 439 are actuated by foot pedals 441 and 442, respectively, and a pair of springs 443 and 444 are provided for biasing the pistons in the working chamber volume-increasing direction. The closed circuit interconnecting working chambers 428, 435 and 438 is maintained liquid-filled by charge pump 319 with which it is connected by conduit 445 and branch conduits 445a and 445b containing reversely set check valves.

Actuator 429 also includes a vent valve comprising inlet port 446 and exhaust port 447 formed in cylinder 434, and a valve land 449 and groove 451 formed on piston 436. Inlet port 446 is in continuous communication with working chamber 425 through conduits 448 and 448a, and exhaust port 447 is in continuous communication with reservoir 321. In the illustrated neutral position of actuator 429, communication between ports 446 and 447 is interrupted by valve land 449, but when the piston 436 is shifted to the left, these ports are interconnected by groove 451.

Actuator 431 is provided with a supply valve comprising an annular chamber 452 formed in cylinder 437 and connected with conduits 448 and 448a, and a valve land 453, groove 454 and radial passage 455, formed in piston 439. When this actuator is in its illustrated neutral position, land 453 interrupts communication between annular chamber 452 and groove 454, but when the piston 439 is moved to the left, the chamber and groove are interconnected and the pressure in the closed circuit interconnecting working chambers 428, 435 and 438 is transmitted to conduit 448 and thence to working chamber 425.

Operation of Third Embodiment

In order to drive the motor 311 of the third embodiment in the forward direction, foot pedal 441 is depressed to cause piston 436 to move inward and permit groove 451 to interconnect ports 446 and 447 and thus vent working chamber 425. If, at this time, plunger 363 of the directional control valve 327 is not in its forward position, spring 422 will move it to that position as soon as working chamber 425 is vented. Continued inward movement of piston 436 displaces fluid from working chamber 435 and this fluid flows through conduit 432 to working chamber 428 where it is effective to shift piston 427 to the left against the bias of spring 426. This movement of piston 427 is accompanied by following movement of valve plunger 343 under the action of graduating spring 351 thereby causing plunger groove 346 to interconnect supply passage 329 and conduit 331. One side of motor 322 is now pressurized and this motor moves cam plate 313 away from its zero displacement position in the forward direction. As the cam plate moves away from the zero displacement position, follow-up linkage 341 moves valve sleeve 338 of the follow-up valve to a null position with respect to valve plunger 343, and when the cam plate 313 reaches a displacement position corresponding to the position of piston actuator 429, the follow-up valve will be in a null position and motor 322 will be hydraulically locked. The displacement of pump 312 and consequently, the speed of motor 311 can be increased progressively by continued shifting of the piston 436 of actuator 429 to the left. When the operator reduces the force being exerted on foot pedal 441, spring 443 moves piston 436 to the right thereby permitting spring 426 of the biasing device to move piston 427 back toward the illustrated position and transfer fluid from working chamber 428 to working chamber 435 of the actuator. As the piston 427 moves to the right, it shifts valve plunger 343 to a vent position with respect to valve sleeve 338 and vents that side of motor 322 which previously had been pressurized. The biasing forces acting on cam plate 313 now move the cam plate back toward the zero displacement position. When the piston 436 of actuator 429 reaches its illustrated neutral position, cam plate 313 will be in the zero displacement position and the follow-up valve 328 will be in the illustrated vent position. At this time, land 449 of actuator 429 will interrupt communication between ports 446 and 447 and thus close the vent path between working chamber 425 and reservoir 321. Because of the presence of spring 422, valve plunger 363 of the directional control valve 327 will be held in its forward position.

When the operator depresses foot pedal 442, piston 439 is moved to the left to open a supply path from working chamber 438 to working chamber 425 comprising radial passage 455, annular groove 454, annular chamber 452 and conduit 448. The fluid under pressure transmitted to working chamber 445 acts on piston 424 and causes it to shift the valve plunger 363 of the directional control valve 327 to the right to its reverse position against the bias of spring 422. Opening of the supply valve is, of course, accompanied by displacement of some fluid from working chamber 438, but spring 426 is designed to exert a much greater biasing force than spring 422 so that during the initial movement of actuator 431, piston 427 moves only a very slight amount. Continued movement of the foot pedal 442 causes piston 439 to displace additional fluid from working chamber 438 and this fluid, which is transmitted to working chamber 428 through conduits 433 and 432, shifts piston 427 to the left against the bias of spring 426. As explained previously, graduating spring 351 now moves valve plunger 343 to a supply position relative to valve sleeve 338 and annular groove 346 interconnects supply passage 329 and conduit 331. Since the directional control valve 327 is now in its reverse position, the right-hand side of motor 322 is now pressurized and this motor moves cam plate 313 away from the zero displacement position in the reverse direction. Because of the presence of follow-up linkage 341, the position of cam plate 313 corresponds to the position of the piston 439 of actuator 431 and is varied progressively as the operator increases and decreases the force exerted on foot pedal 442. When the operator releases the pedal 442, spring 444 moves piston 439 back to the illustrated neutral position. Because of the difference in the forces exerted by springs 422 and 426, piston 427 moves back to its illustrated position, and thus reduces the displacement of pump 312 to zero, before the directional control valve 327 commences to shift to the left under the action of spring 422. If the operator reduces the force exerted on foot pedal 442 slowly, the directional control valve 327 will be permitted to move back to its forward position as piston 439 moves back to its neutral position. However, if the force exerted on foot pedal 442 is released suddenly, the supply valve of actuator 431 will close before spring 422 is able to return the directional control valve 327 to its forward position. In this event, cavitation in the closed circuit connecting working chamber 428, 435 and 438 is prevented by charge pump 319 which maintains this circuit liquid-filled through conduits 445, 445b and 445a. In contrast to the first embodiment of the invention, it is not essential in this embodiment, or for that matter in the second embodiment, that the directional control valve 327 assume a neutral position when the manual actuators are in their neutral positions because the follow-up valve 328 is biased to a vent position and reduces the displacement of pump 312 to zero whenever the manual actuators are returned to a neutral position. When the forward actuator 429 is again operated, working chamber 425 will be vented and, therefore, if valve plunger 363 was not returned to its forward position at the end of the preceding reverse operation, it will now be moved to that position at the commencement of forward operation.

It will be apparent that the operation of the override motors in the third embodiment is the same as the operation of their counterparts in the second embodiment, so description of this operation is deemed unnecessary. It will also be apparent that in the event the lift truck embodiment of FIG. 1 employs an implement circuit, that transmission may also include a second override motor that responds to the load pressure in the implement circuit.

While three embodiments of the invention have been described herein in detail, it will be obvious that many changes can be made in the structures of these embodiments without departing from the inventive concept. In view of this, the following claims should provide the sole measure of the scope of the invention.

What is claimed is:
1. In a hydrostatic transmission, the combination of
  a. a reversible motor;
  b. a pump;
  c. first and second conduits interconnecting the pump and motor in a transmission circuit;
  d. a reservoir;
  e. pump displacement varying means shiftable in opposite directions from a zero displacement position toward a maximum forward displacement position or toward a maximum reverse displacement position;
  f. means biasing the displacement varying means toward the zero displacement position;
  g. first and second opposed fluid pressure motors, each operatively connected with said displacement varying means;
  h. a source of fluid pressure;
  i. a delivery conduit leading from the source;
  j. a manually operated directional control valve including a supply conduit and having a neutral position in which it permits said first and second motors to float whereby the biasing means can move the displacement varying means toward zero displacement position, a forward position in which it connects the first motor with the supply conduit and connects the second motor with the reservoir, and a reverse position in which it connects the second motor with the supply conduit and connects the first motor with the reservoir;
  k. follow-up valve means connected with the reservoir, the supply conduit and the delivery conduit and including a valve element and a valve member;
  l. follow-up means connected with the first and second motors, the displacement varying means and the valve element and operative to shift said element unidirectionally from an initial position corresponding to the zero displacement position of the displacement varying means;
  m. a third fluid pressure motor operatively connected with the valve member to shift it unidirectionally;
  n. a graduating spring acting in opposition to the third fluid pressure motor;
  o. shifting of the valve element and valve member relatively to one another establishing a null position in which the supply conduit is isolated from both the delivery conduit and the reservoir, or establishing a displacement increasing position in which the delivery and supply conduits are interconnected, or establishing a displacement reducing position in which the supply conduit and the reservoir are interconnected; and
  p. a selector valve effective selectively to connect the third pressure motor with the first and second conduits when the directional control valve is in the forward and reverse positions, respectively.

2. The combination defined in claim 1
  a. in which the biasing means includes a fourth fluid pressure motor that is connected with the source;
  b. in which the supply conduit is blocked by the directional control valve when the latter is in its neutral position.

3. The combination defined in claim 1
  a. in which the source comprises a charge pump having discharge passage means connected to supply liquid to the first and second conduits, and means inhibiting reverse flow from said conduits to the charge pump; and
  b. in which the supply conduit is blocked by the control valve when the latter is in its neutral position.

4. The combination defined in claim 2 in which the source comprises
  a. a charge pump having discharge passage means connected to supply liquid to the first and second conduits; and
  b. means inhibiting reverse flow from said conduits to the charge pump.

5. The combination defined in claim 1 including manually operable means connected with the valve member to shift it relatively to the valve element toward a displacement reducing position.

6. The combination defined in claim 3 including manually operable means connected with the valve member to shift it relatively to the valve element toward a displacement reducing position.

7. The combination defined in claim 4 including manually operable means connected with the valve member to shift it relatively to the valve element toward a displacement reducing position.

8. The combination defined in claim 1 including
   a. high pressure pilot-operated relief valve means connected with the first and second conduits and having piloting motor means;
   b. an exhaust conduit leading from the piloting motor means; and
   c. valve means in the exhaust conduit and connected with the directional control valve, said valve means being open only when the directional control valve is in the neutral position.

9. The combination defined in claim 4 including
   a. high pressure pilot-operated relief valve means connected with the first and second conduits and having piloting motor means;
   b. an exhaust conduit leading from the piloting motor means; and
   c. valve means in the exhaust conduit and connected with the directional control valve, said valve means being open only when the direction control valve is in the neutral position.

10. The combination defined in claim 5 including
    a. high pressure pilot-operated relief valve means connected with the first and second conduits and having piloting motor means;
    b. an exhaust conduit leading from the piloting motor means; and
    c. valve means in the exhaust conduit and connected with the directional control valve, said valve means being open only when the directional control valve is in the neutral position.

11. The combination defined in claim 1 including
    a. valve biasing means connected with said valve member for overpowering the graduating spring and shifting the valve member to a displacement reducing position; and
    b. manual actuating means for shifting the valve member toward a displacement increasing position against the opposition of the valve biasing means.

12. The combination defined in claim 11 in which the manual actuating means comprises
    a. first and second actuators, each shiftable between a neutral position and an operating position;
    b. means connecting the first and second actuators with the directional control valve so that the first actuator moves the control valve between the neutral position and the forward position and the second actuator moves the control valve between the neutral position and the reverse position; and
    c. means defining lost motion connections between the first and second actuators and the valve member, whereby the first and second actuators move the valve member toward a displacement increasing position only after they have first moved the directional control valve to the forward and reverse positions, respectively.

13. The combination defined in claim 12 in which the manual actuating means includes interlock means connected with the first and second actuators for preventing either actuator from shifting the directional control valve when the other actuator is away from its neutral position.

14. The combination defined in claim 1 including
    a. first valve biasing means connected with said valve member for overpowering the graduating spring and shifting the valve member to a displacement reducing position;
    b. a fourth fluid pressure motor having a working chamber and a movable member connected with the valve biasing means for disabling it and permitting the graduating spring to move the valve member toward a displacement increasing position;
    c. second valve biasing means urging the directional control valve toward one of its forward and reverse positions;
    d. a fifth fluid pressure motor having a working chamber and a movable member connected with the directional control valve for shifting it toward the other of its reverse and forward positions against the opposition of the second valve biasing means;
    e. sixth and seventh fluid pressure motors, each having a working chamber and a movable element;
    f. a closed liquid-filled circuit interconnecting the working chambers of the fourth, sixth and seventh fluid pressure motors;
    g. a pair of manual actuators, one connected with the movable element of each of the sixth and seventh fluid pressure motors for moving it in working chamber volume-decreasing and volume-increasing directions; and
    h. means for pressurizing and venting the working chamber of the fifth fluid pressure motor as the movable element of the sixth and seventh motors, respectively, is moved in the chamber volume-decreasing direction.

15. The combination defined in claim 14 in which the last-mentioned means comprises:
    a. a first shuttle valve connected with the working chambers of the fifth and sixth fluid pressure motors and shiftable between positions in which the working chambers are connected and disconnected as the movable element of the sixth motor is moved in chamber volume-decreasing and chamber volume-increasing directions, respectively; and
    b. a second shuttle valve connected with the reservoir and the working chamber of the fifth fluid pressure motor and shiftable between positions in which the working chamber and the reservoir are connected and disconnected as the movable element of the seventh fluid pressure motor is moved in chamber volume-decreasing and chamber volume-increasing directions, respectively.

16. The combination defined in claim 14 which includes
    a. a third conduit connecting the source with the closed liquid-filled circuit; and
    b. a check valve located in the third conduit and arranged to prevent flow from the liquid-filled circuit to the source.

17. The combination defined in claim 1 including
    a. a pair of manual actuators, each movable between a neutral position and a second position;
    b. resilient means connecting each actuator with the directional control valve whereby one actuator may move the directional control valve between its neutral position and its forward position, and the other actuator may move the directional control valve between its neutral position and its reverse position; and
    c. interlock means connected with the actuators for preventing either from moving the directional control valve when the other is away from its neutral position.

18. A hydrostatic transmission comprising
    a. a reversible motor;
    b. a variable displacement pump having a displacement control element movable between maximum displacement positions on opposite sides of a zero displacement position to vary the output of and the direction of flow through the pump;
    c. means biasing the displacement control element toward the zero displacement position;

d. first and second conduits interconnecting the pump and motor in a transmission circuit;
e. a reservoir;
f. a source of fluid under pressure;
g. first and second opposed fluid pressure motors connected with the displacement control element for moving it in opposite directions from the zero displacement position;
h. a directional control valve connected with the reservoir and the first and second motors and including a supply passage and a movable member, the movable member having a forward position in which the first motor is connected with the supply passage and the second motor is connected with the reservoir, a reverse position in which the connections between the motors and the supply passage and the reservoir are reversed, and an intermediate neutral position in which the valve permits the first and second motors to float whereby the biasing means can move the displacement control element to the zero displacement position;
i. a follow-up valve connected with source, the supply passage and the reservoir and including a movable valve element and a coacting movable valve member, the valve element and member having a first relative or vent position in which the supply passage is connected with the reservoir and both the valve element and member being movable from the vent position in the same first direction, movement of the valve member from the vent position in said first direction establishing in sequence a second relative or null position in which the supply passage is isolated from both the source and the reservoir and a third relative or supply position in which the supply passage is connected with the source;
j. follow-up means connecting the valve element with the displacement control element for moving the valve element in said first direction as the displacement control element moves away from the zero displacement position and for moving the valve element in a second direction opposite to said first direction when the displacement control element moves toward the zero displacement position;
k. a graduating spring biasing the valve member of the follow-up valve in one direction of motion; and
l. manually operable means for shifting the valve member of the follow-up valve in opposition to the graduating spring.

19. The combination defined in claim 18 in which
a. the graduating spring biases the valve member of the follow-up valve in said first direction; and
b. the manually operable means comprises
   (1) biasing means for overpowering the graduating spring and shifting the valve member in said second direction; and
   (2) a manually operable actuator for disabling the biasing means to thereby allow the graduating spring to move the valve member in said first direction.

20. The combination defined in claim 19 including
a. a third fluid pressure motor connected with the valve member of the follow-up valve and arranged to shift it in said second direction; and
b. a selector valve effective selectively to connect the third fluid pressure motor with the first and second conduits, respectively, when the directional control valve is in the forward and reverse positions.

21. A hydrostatic transmission comprising
a. a reversible motor;
b. a variable displacement pump having a displacement control element movable between maximum displacement positions on opposite sides of a zero displacement position to vary the output of and the direction of flow through the pump;
c. means biasing the displacement control element toward the zero displacement position;
d. first and second conduits interconnecting the pump and motor in a transmission circuit;
e. a reservoir;
f. a source of fluid under pressure;
g. first and second opposed fluid pressure motors connected with the displacement control element for moving it in opposite directions from the zero displacement position;
h. a directional control valve connected with the reservoir and the first and second motors and including a supply passage and a movable member, the movable member having a forward position in which the first motor is connected with the supply passage and the second motor is connected with the reservoir and a reverse position in which the connections between the motors and the supply passage and the reservoir are reversed;
i. a follow-up valve connected with the source, the supply passage and the reservoir and including a movable valve element and a coacting movable valve member, the valve element and member having a first relative or vent position in which the supply passage is connected with the reservoir and both the valve element and member being movable from the vent position in the same first direction, movement of the valve member from the vent position in said first direction establishing in sequence a second relative or null position in which the supply passage is isolated from both the source and the reservoir and a third relative or supply position in which the supply passage is connected with the source;
j. follow-up means connecting the valve element with the displacement control element for moving the valve element in said first direction as the displacement control element moves away from the zero displacement position and for moving the valve element in a second direction opposite to said first direction when the displacement control element moves toward the zero displacement position;
k. a graduating spring biasing the valve member of the follow-up valve in said first direction; and
l. manually operable means for shifting the valve member of the follow-up valve in opposition to the graduating spring.

References Cited in the file of this patent

UNITED STATES PATENTS

| | | |
|---|---|---|
| 2,896,411 | Bowers | July 28, 1959 |
| 2,961,829 | Weisenbach | Nov. 29, 1960 |
| 3,017,750 | Kempson | Jan. 23, 1962 |